(12) United States Patent
Yang et al.

(10) Patent No.: US 8,119,722 B2
(45) Date of Patent: Feb. 21, 2012

(54) POLYANILINE/C-MWNT NANOCOMPOSITE

(75) Inventors: Cheng-Chien Yang, Longtan Township, Taoyuan County (TW); Jui-Ming Yeh, Zhongli (TW); Wang-Tsai Gu, Longtan Township, Taoyuan County (TW); Yuen-Hsin Peng, Longtan Township, Taoyuan County (TW); Kuan-Yeh Huang, Zhongli (TW)

(73) Assignee: Chung-Shan Institute of Science and Technology, Armaments Bureau, Minstry of National Defense, Taoyuan County (TW)

( * ) Notice: Subject to any disclaimer, the term of this patent is extended or adjusted under 35 U.S.C. 154(b) by 0 days.

(21) Appl. No.: 13/188,375

(22) Filed: Jul. 21, 2011

(65) Prior Publication Data

US 2011/0278505 A1 Nov. 17, 2011

Related U.S. Application Data

(62) Division of application No. 12/420,000, filed on Apr. 7, 2009.

(51) Int. Cl.
*H01B 1/12* (2006.01)
*B82Y 99/00* (2011.01)

(52) U.S. Cl. .......... 524/496; 524/612; 524/847
(58) Field of Classification Search .......... 524/496, 524/612, 847
See application file for complete search history.

(56) References Cited

U.S. PATENT DOCUMENTS

| | | | |
|---|---|---|---|
| 2006/0062981 A1* | 3/2006 | Wallach | 428/215 |
| 2006/0274047 A1* | 12/2006 | Spath et al. | 345/173 |
| 2008/0013258 A1* | 1/2008 | Viswanathan et al. | 361/509 |
| 2008/0131658 A1* | 6/2008 | Wakharkar et al. | 428/137 |

* cited by examiner

*Primary Examiner* — Kelechi Egwim

(57) ABSTRACT

The invention discloses a polyaniline/c-MWNT produced by carboxylating at least one carbon nanotube to form at least one carboxylic carbon nanotube; mixing the at least one carboxylic carbon nanotube with a solvent to form a first carbon nanotube solution; mixing at least one aniline monomer with the first carbon nanotube solution to form a second carbon nanotube solution; mixing an ammonium persulfate solution with the second carbon nanotube solution to form a third carbon nanotube solution; air-extracting and filtering the third carbon nanotube solution to obtain the polyaniline/c-MWNT nanocomposite; cleaning and baking the polyaniline/c-MWNT nanocomposite.

8 Claims, 3 Drawing Sheets

POLYANILINE/C-MWNT NANOCOMPOSITE

The present application is a Divisional application of U.S. application Ser. No. 12/420,000, and claims the US priority filing date of Apr. 7, 2009;

BACKGROUND OF THE INVENTION

1. Field of the Invention

The present invention relates generally to a polyaniline/c-MWNT nano-composite, and more particularly, the present invention relates to a polyaniline/c-MWNT nanocomposite which could be used for electromagnetic shielding or anti-static shielding.

2. Description of the Prior Art

As electronic devices are designed smaller and smaller with higher and higher density, electronic devices are disturbed more and more seriously by electromagnetic waves and radiation frequency. Therefore, the electron-magnetic compatibility of an electronic device is always concerned while fabricated, stored, transported and operated. Because electronic devices are broadly applied to various fields including the people's livelihood, the national defense and even the space industry, etc, how to avoid the disturbance by electromagnetic waves and radiation frequency has become the gist of research.

Those electronic devices need avoiding the disturbance of electromagnetic waves and radiation frequency could adopt conducting shields to cut off the electromagnetic waves. When electromagnetic waves pass through the shields, the energy of electromagnetic waves would be reflected or absorbed and therefore the disturbance of the electromagnetic waves could be decreased. In conventional arts, conducting materials are electroplated or coated on plastic casing, or infilled in plastic casing for electromagnetic shielding. The method of electroplating to electroplate metals on casing has disadvantages of pollution, inconvenience in manufacturing, and high cost. Moreover, a metal shield has a problem of easy oxidation. A metal shield avoids the disturbance by means of reflecting electromagnetic waves, however, as for some other application fields such as national defense, electromagnetic waves should be shielded by means of absorbing them. On the other hand, the method of infilling conductive materials in plastic casing has problems such as bad efficiency of shielding and difficulties in recycling plastic casings. To summarize, a material with low pollution, high conductivity, microwave absorption, and capable of coated on a large area could solve the problems mentioned above.

Electromagnetic shielding effect is related to the absorbing and reflecting ability of a material. A metal shield has high density of free charge on its surface, so when electromagnetic waves incident the surface of a metal, most of the electromagnetic waves will be reflected. Therefore, a metal shield avoids the disturbance by means of reflecting electromagnetic waves.

When electromagnetic waves incident a conductive high polymer, the conductive high polymer generates an induced current corresponding to the electromagnetic waves and transforms the electric energy to heat by means of the flowage of the induced current to deplete the energy of the electromagnetic waves. Thereby, a conductive high polymer could avoid the disturbance by means of absorbing electromagnetic waves. Among all kinds of conductive high polymers, the polyaniline, which is a material with high potential, has advantages of high conductivity, cheap raw materials, high stability, and easy fabrication.

Otherwise, the carbon nanotube has fine physical, mechanical, chemical, and electric characteristics as well as high stability, so it is widely applied to various fields. Moreover, a composite is composed of two or more materials with different material characteristics by means of physical or chemical combination, so the composite not only has better property than any one of the composition but also keeps every single material's origin characteristic. Practically, nanocomposite has become an important issue for researchers from all over the world because of its enormous potential. A composite including carbon nanotubes therein succeeds to the characteristic of the carbon nanotube, and it is supposed to have high value.

However, the carbon nanotubes tend to entwine each other owing to their own van der waals force. And also because the chemical stability, there is no functional groups on the surface of the carbon nanotube, so that they are difficultly dissolved or dispersed in organic solvent or water. The above-mentioned characteristics of carbon nanotubes are problems waiting to be improved.

SUMMARY OF THE INVENTION

Accordingly, an aspect of the present invention is to provide a method for fabricating a polyaniline/c-MWNT nanocomposite which the carboxylic carbon nanotubes disperse in the polyaniline to form the polyaniline/c-MWNT nano-composite that could be used for electromagnetic shielding or anti-static shielding to solve the problems mentioned above.

According to an embodiment of the invention, the method for fabricating a polyaniline/c-MWNT nanocomposite comprises the following steps: firstly, carboxylating at least one carbon nanotube to form at least one carboxylic carbon nanotube; then mixing the at least one carboxylic carbon nanotube with a solvent to form a first carbon nanotube solution; subsequently, mixing at least one aniline monomer with the first carbon nanotube solution to form a second carbon nanotube solution; next, mixing an ammonium persulfate solution with the second carbon nanotube solution to form a third carbon nanotube solution; after that, air-extracting and filtering the third carbon nanotube solution to obtain the polyaniline/c-MWNT nanocomposite; finally, cleaning and baking the polyaniline/c-MWNT nanocomposite.

In the embodiment, the carbon nanotubes could be mixed with a sulfuric acid/nitric acid solution and ultrasonic vibrated to obtain the carboxylic carbon nanotubes. There are functional groups on the surfaces of the carboxylic carbon nanotubes and the functional groups increase the solvability of the carboxylic carbon nanotubes in an organic solvent or water. The at least one aniline monomer is mixed with the carboxylic carbon nanotubes in the solvent and processed with appropriate treatment (e.g. ice bathed or agitated) to form the second carbon nanotube solution. The second carbon nanotube solution is then reacted with the ammonium persulfate solution (initiator) to form the polyaniline. Meanwhile, the carboxylic carbon nanotubes are dispersed in the polyaniline to produce the polyaniline/c-MWNT nanocomposite. The third carbon nanotube solution after reacted with the ammonium persulfate solution (initiator) is filtered, and the filtered products are cleaned and baked to obtain the polyaniline/c-MWNT nanocomposite.

Another aspect of the present invention is to provide a polymer composite which could be used for electromagnetic shielding or anti-static shielding.

In an embodiment, the polymer composite of the invention comprises a polyaniline and carboxylic carbon nanotubes dispersing in the polyaniline. The carboxylic carbon nanotubes are obtained by means of carboxylating carbon nanotubes, wherein the steps of carboxylating include the following steps: mixing the carbon nanotubes with a sulfuric acid/nitric acid solution and ultrasonic vibrating the mixed solution of the carbon nanotubes and the sulfuric acid/nitric acid solution to obtain the carboxylic carbon nanotubes. There are functional groups on the surfaces of the carboxylic carbon nanotubes and the functional groups increase the solvability of the carboxylic carbon nanotubes in an organic solvent or water.

In the embodiment, an aniline monomer could be mixed with carboxylic carbon nanotubes in a solvent and processed with appropriate treatment (e.g. ice bathed or agitated) to form a solution of carboxylic carbon nanotubes with the aniline monomer. An ammonium persulfate solution (initiator) is mixed with the solution mentioned above to make the aniline monomer to form the polyaniline. Simultaneously, the carboxylic carbon nanotubes are dispersed in the polyaniline. Subsequently, the mixed solution is filtered and then the polyaniline/c-MWNT nanocomposite with carboxylic carbon nanotubes dispersing in the polyaniline is obtained. The polyaniline/c-MWNT nanocomposite is the polymer composite of the invention.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
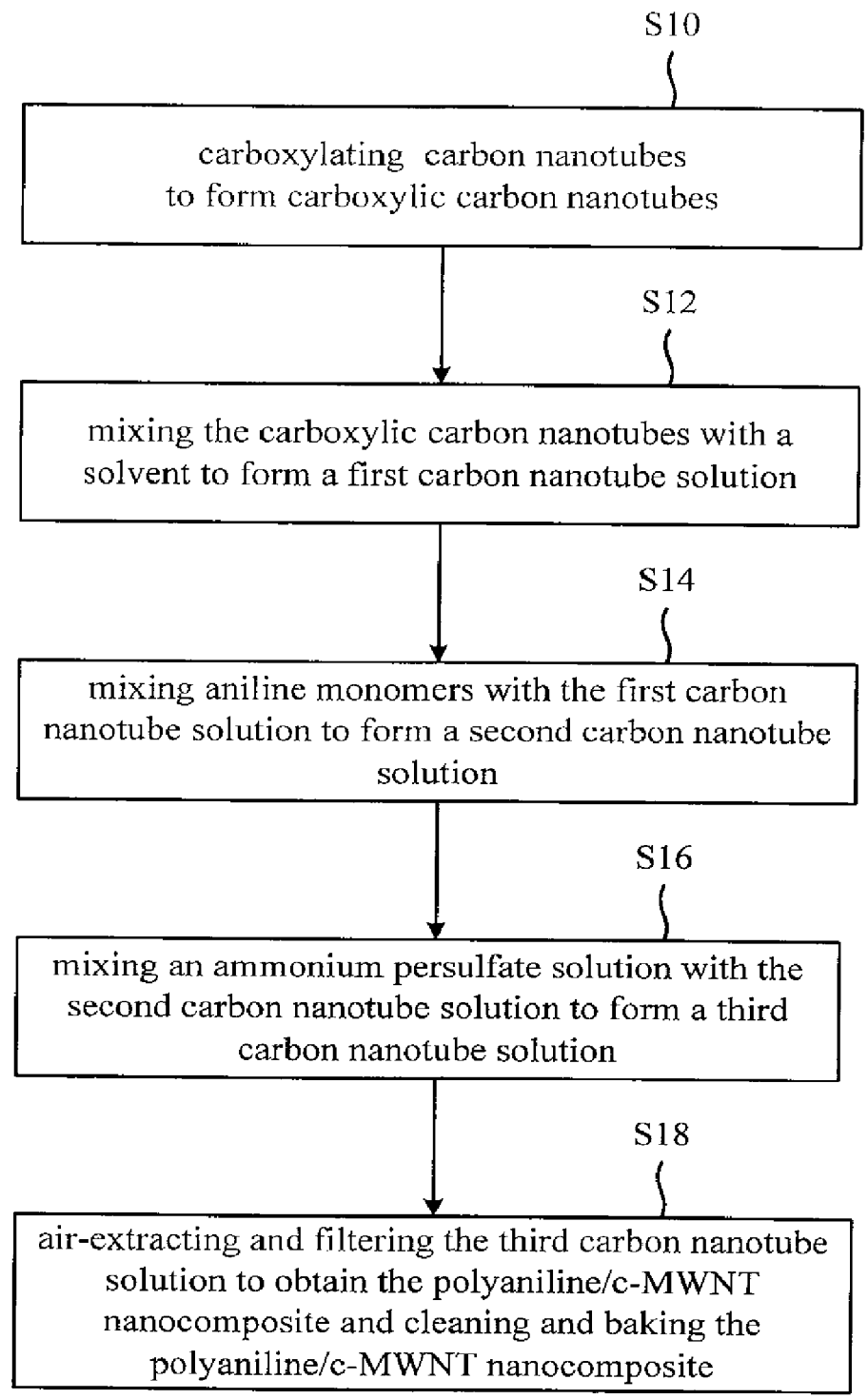
FIG. 1 is a flow chart illustrating a method for fabricating a polyaniline/c-MWNT nano-composite according to an embodiment of the invention.

Please refer to FIG. 1. FIG. 1 is a flow chart illustrating a method for fabricating a polyaniline/c-MWNT nano-composite according to an embodiment of the invention. The polyaniline/c-MWNT nanocomposite fabricated by means of the method of the embodiment could be coated on shielding casings of electronic devices as a material for electromagnetic shielding or anti-static shielding.

As illustrated in FIG. 1, the fabricating method of the embodiment includes the following steps. In step S10, carbon nanotubes are carboxylated to form carboxylic carbon nanotubes. In step S12, the carboxylic carbon nanotubes are mixed with a solvent to form a first carbon nanotube solution. In step S14, aniline monomers are mixed with the first carbon nanotube solution to form a second carbon nanotube solution. In step S16, an ammonium persulfate solution is mixed with the second carbon nanotube solution to form a third carbon nanotube solution. Finally, in step S18, the third carbon nanotube solution is air-extracted and filtered to obtain the polyaniline/c-MWNT nanocomposite, and the polyaniline/c-MWNT nanocomposite is cleaned and baked.

Practically, all of the solutions formed in the steps mentioned above could be processed a treatment, depending on the requirement, to help the aniline monomers and the carboxylic carbon nanotubes dissolved therein. For example, the first carbon nanotube solution could be agitated for a night to make the carboxylic carbon nanotubes dissolved therein. Moreover, the second carbon nanotube solution could be ice bathed and agitated for 0.5 hour to make the aniline monomers dissolved therein. Furthermore, the third carbon nanotube solution could be ice bathed and agitated for 3 hours to make the ammonium persulfate solution completely mixed with the second carbon nanotube solution mentioned above.

In the embodiment, because there is no interaction force existing between the carbon nanotubes and the polymer composite, and also there is no functional group on the surface of the carbon nanotube, the carbon nanotube is difficultly dispersed in the polyaniline and combined with the polyaniline. In the step S10, after carboxylating the carbon nanotubes, the carboxylic carbon nanotubes possesses higher solvability because of the —COOH functional groups on the surface thereof which helps the carboxylic carbon nanotube dispersed in the polyaniline and combined with the polyaniline.

Figure 2:
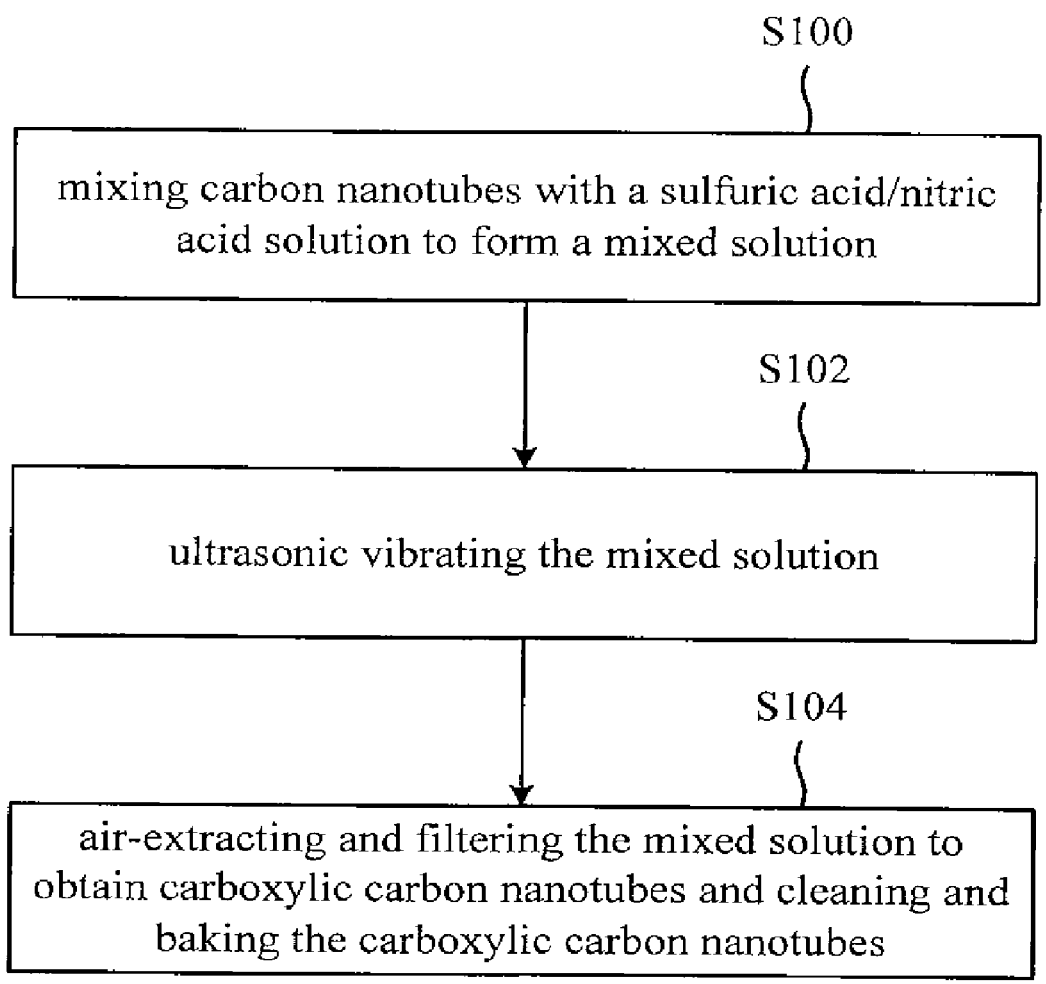
FIG. 2 is a flow chart illustrating the process of carboxylating the carbon nanotubes in FIG. 1.

Please refer to FIG. 2. FIG. 2 is a flow chart illustrating the process of carboxylating the carbon nanotubes in FIG. 1. As illustrated in FIG. 2, the process includes the following steps. In step S100, the carbon nanotubes are mixed with a sulfuric acid/nitric acid solution to form a mixed solution. In step S102, the mixed solution is ultrasonic vibrated. In step S104, the mixed solution is filtered to obtain the carboxylic carbon nanotubes, and the carboxylic carbon nanotubes obtained is cleaned and baked.

Practically, the carbon nanotubes mentioned above could be, but not limited to, multi-wall carbon nanotubes. The ratio of the sulfuric acid to the nitric acid of the sulfuric acid/nitric acid solution in the step S100 could be 3:1 in practical applications, wherein the concentration of the sulfuric acid therein could be 90% wt and that of the nitric acid therein could be 70% wt. The process of ultrasonic vibrating the mixed solution in the step S102 could be under the temperature range of 20±5° C. in the embodiment, however, the range of the temperature could depend on the requirement of users, but not limited to the embodiment of the invention. Moreover, the ultrasonic vibrating time could depend on users' requirement as well, but not limited to a specific period of time. For example, the mixed solution could be ultrasonic vibrated under the temperature range of 20±5° C. for 4, 8, 12, or 24 hours. Please notice that the ultrasonic vibrating is for assisting the carbon nanotube in forming —COOH functional groups on the surface of the carbon nanotubes to increase solvability of the carbon nanotubes in the solvent. Thus, the longer the ultrasonic vibrating time is, the easier it is for the carboxylic carbon nanotube to be dissolved in the solvent. However, forming —COOH functional groups on the surface of the carbon nanotubes means that the sp2 bonding thereon would be damaged, thus the longer the ultrasonic vibrating time is, the lower the conductivity of the carboxylic carbon nanotubes is.

Figure 3:
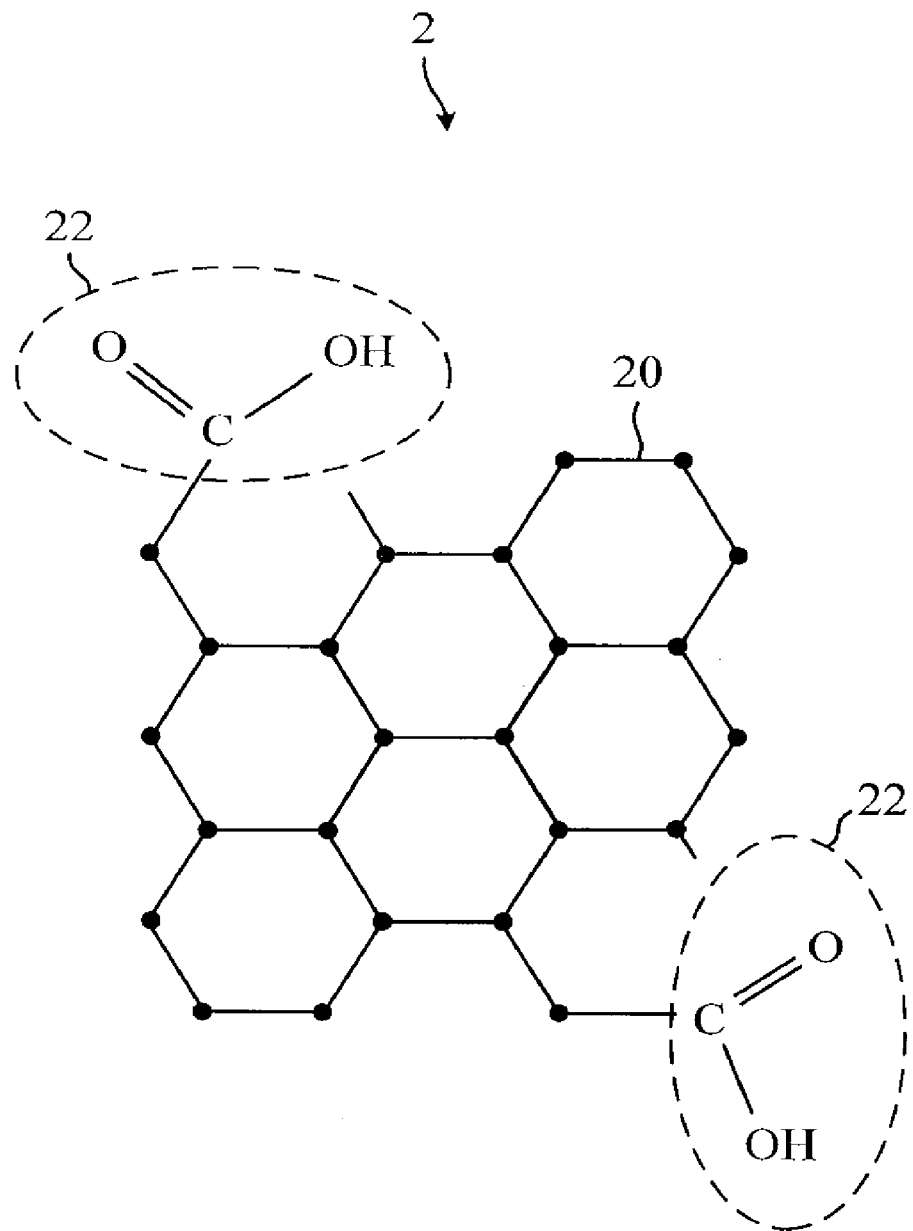
FIG. 3 illustrates the structure of part surface of a carboxylic carbon nanotube according to an embodiment of the invention.

Please refer to FIG. 3. FIG. 3 illustrates the structure of part surface of a carboxylic carbon nanotube 2 according to an embodiment of the invention. As illustrated in FIG. 3, the surface of the carboxylic carbon nanotube 2 is constructed by hexagonal structure 20. The difference between the carboxylic carbon nanotube 2 and the common carbon nanotube is that some of the sp2 bonding of the hexagonal structure 20 is damaged and connected with —COOH functional group 22. Practically, the longer the ultrasonic vibrating time is, the larger the number of the —COOH functional group 22 is.

The filtered carboxylic carbon nanotubes in the step S106 in the embodiment could be cleaned by deionized water and methanol repeatedly for several times and then baked in an oven under 60° C. for 24 hours to get rid of extra water of the carboxylic carbon nanotubes. Similarly, the cleaning fluid, the temperature of the oven and the baking time could be adjusted according to the requirement of users, but not limited to the embodiment of the invention.

Please refer to FIG. 1 again. The composition of the solvent mixed with the carboxylic carbon nanotubes in the step S12 in FIG. 1 could be hydrogen chloride. Subsequently, in the step S14 the aniline monomers are mixed with the first carbon nanotube solution in the step S12 to form a second carbon nanotube solution. In the step S16 the ammonium persulfate solution is mixed with the second carbon nanotube solution to form a third carbon nanotube solution. In the step S18 the polyaniline/c-MWNT nanocomposite is filtered and obtained from the third carbon nanotube solution and then cleaned and baked.

In the embodiment, the polyaniline formed from the aniline monomers by means of the steps mentioned above is an emeraldine base form of polyaniline. A common emeraldine base form of polyaniline has conjugated double bonds. However, such form of polyaniline lacks of free charge resulting in bad conductivity, so the polyaniline needs providing with free charge on the conjugated double bonds by means of doping to improve its conductivity. In the embodiment, the first carbon nanotube solution which is mixed with the aniline monomers includes hydrogen chloride (namely, polyaniline dopant). The polyaniline doped with low pH value protic acid has much higher conductivity and is suitable for electromagnetic shielding or anti-static shielding. Similarly, the doped protic acid, as a dopant which increases the conductivity of the polyaniline, could be other inorganic acids such as phosphoric acid in practical applications.

On the other hand, the ammonium persulfate in the step S16 of the embodiment is used as an initiator to assist the aniline monomers with polymerization to form the polyaniline. In the embodiment, the ammonium persulfate solution is a mixture of ammonium persulfate and hydrochloric acid.

According to another embodiment, the polymer composite of the invention could include a polyaniline/c-MWNT nanocomposite, wherein the polyaniline/c-MWNT nanocomposite further includes a polyaniline and carboxylic carbon nanotubes dispersing in the polyaniline, which could be formed by means of the fabricating method disclosed above, so the details of the fabricating method are not described again here.

In the embodiment, there are functional groups on the surfaces of the carboxylic carbon nanotubes so that the carboxylic carbon nanotubes could disperse in the polyaniline during the process of fabricating the polymer composite, unlike uncarboxylic carbon nanotubes untwine each other which are difficultly dispersed. Moreover, during the process of fabricating the polyaniline of the polyaniline/c-MWNT nanocomposite, an inorganic acid, such as hydrogen chloride or phosphoric acid, is doped to provide the polyaniline with free charge on the conjugated double bonds thereof to improve the conductivity of the polyaniline.

Because a polymer composite will have the characters of the original materials, the polyaniline/c-MWNT nanocomposite of the embodiment will have good conductivity as the doped polyaniline and the carbon nanotube. The polyaniline/c-MWNT nanocomposite could be coated on casings of electronic devices for electromagnetic shielding or anti-static shielding to protect electronic devices against the disturbance of electromagnetic waves or static electricity. Otherwise, the polyaniline/c-MWNT nanocomposite keeps the physical characteristics and chemical characteristics of the polyaniline and the carbon nanotube those make the polyaniline/c-MWNT nanocomposite could be applied to their original application domains respectively.

Compared to the prior art, the polymer composite and the fabricating method for making the same of the invention could provide functional groups on the surfaces of the carboxylic carbon nanotubes that help the carboxylic carbon nanotubes with dispersing in the polyaniline to form the polyaniline/c-MWNT nanocomposite. The polyaniline is doped with low pH value protic acid while fabricating that makes it has much higher conductivity. Moreover, the carbon nanotube itself has good conductivity as well. All that makes the polyaniline/c-MWNT nanocomposite suitable as a conductive coating material to protect electronic devices against the disturbance of electromagnetic wave or static electricity, so as to affectively extend the lifetime of electronic devices.

Although the present invention has been illustrated and described with reference to the preferred embodiment thereof, it should be understood that it is in no way limited to the details of such embodiment but is capable of numerous modifications within the scope of the appended claims.

The invention claimed is:

1. A polymer composite, obtained, by cleaning and baking, after air-extracting and filtering a third carbon nanotube solution, comprising an ammonium persulfate solution mixed with a second carbon nanotube solution, wherein the second carbon nanotube solution includes at least one aniline monomer mixed with a first carbon nanotube solution, and
the first carbon nanotube solution includes at least one carbon nanotube mixed with a solvent to form a carboxylic carbon nanotube.

2. The polymer composite of claim 1, wherein the carboxylic carbon nanotubes is obtained by mixing at least one carbon nanotubes with a sulfuric acid/nitric acid solution to form a mixed solution, ultrasonic vibrating the mixed solution, and filtering the mixed solution to obtain the at least one carboxylic carbon nanotube.

3. The polymer composite of claim 2, wherein the ratio of the sulfuric acid to the nitric acid of the sulfuric acid/nitric acid solution is 3:1.

4. The polymer composite of claim 2, wherein the mixed solution is ultrasonic vibrated under the temperature range of 20±5° C.

5. The polymer composite of claim 1, wherein the composition of the solvent is hydrochloric acid, namely, hydrogen chloride.

6. The polymer composite of claim 1, wherein the ammonium persulfate solution is a mixture of ammonium persulfate and a first solvent.

7. The polymer composite of claim 6, wherein the composition of the first solvent is substantially the same as that of the solvent.

8. The polymer composite of claim 1, wherein the polyaniline is an emeraldine base form of polyaniline.

* * * * *